June 3, 1969  C. P. MAJKRZAK  3,447,314
LUBRICATING ARRANGEMENT FOR MERCURY-VAPOR TURBOGENERATOR
Filed May 8, 1967
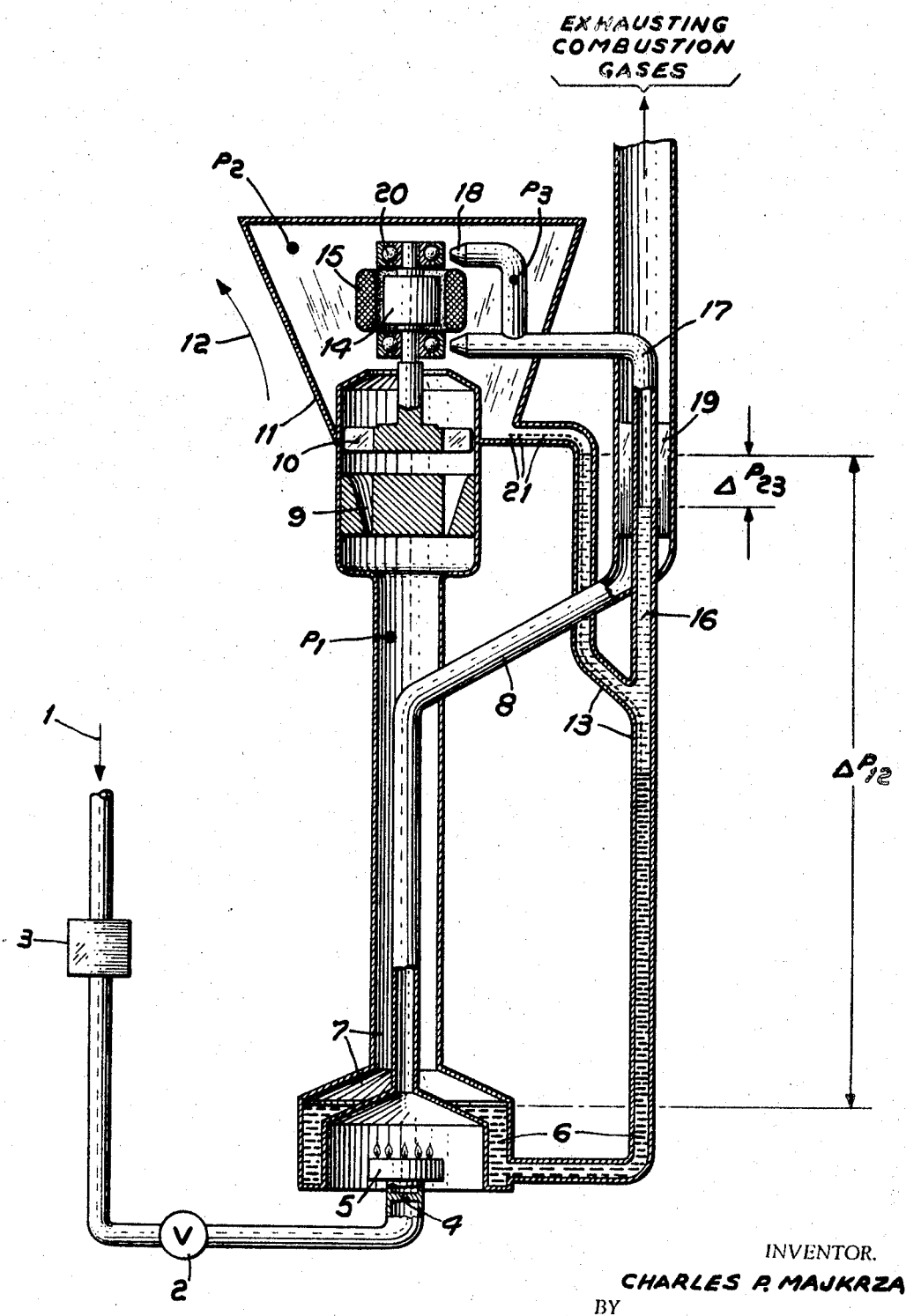
INVENTOR.
CHARLES P. MAJKRZAK
BY
ATTORNEY

United States Patent Office 3,447,314
Patented June 3, 1969

---

3,447,314
LUBRICATING ARRANGEMENT FOR MERCURY-VAPOR TURBOGENERATOR
Charles P. Majkrzak, Nutley, N.J., assignor to International Telephone and Telegraph Corporation, Nutley, N.J., a corporation of Maryland
Filed May 8, 1967, Ser. No. 636,836
Int. Cl. F01k 25/14; F02c 7/34; F16n 7/40
U.S. Cl. 60—36                                    10 Claims

ABSTRACT OF THE DISCLOSURE

An arrangement is provided for using residual heat and exhausted gases to heat a lubricating fluid, to vaporize it, and to create a pressure differential across a nozzle or orifice located in the condenser of a mercury vapor turbogenerator so as to lubricate the bearings with a vapor mist. The lubricating fluid is then condensed and consequently is entrapped atop the liquid mercury column in the feed line. This is possible due to the greater specific weight of the mercury with respect to the lubricant.

Cross reference to related applications

This assignee's related applications include a "Power Supply System," Serial No. 556,990, filed June 13, 1966, and "An Oceanographic Data Collecting Buoy Arrangement," Serial No. 619,978, filed Mar. 2, 1967.

Background of the invention

In general this invention relates to a mercury-vapor turbogenerator which provides an electrical supply for remote marine stations, and, more particularly, to a means for using residual heat and exhaust gases to heat lubricating fluid, to vaporize it, and to create a pressure differential across a nozzle or orifice located in the condenser so as to lubricate the bearings of the turbogenerator with a vapor mist.

In any long term unattended operation of a turbine, automatic bearing lubrication must be provided, and prior arrangements have not provided the continuing lubrication necessary during the entire turbine operating cycle. The most efficient lubricating means is a lubricating mist directed upon the high speed bearings during operation. Most lubricating systems employ an intermittent drip type lubricating arrangement, or, in low speed applications, utilize bearings which are lubricated for long life with grease so as to avoid the problems inherent in constant relubrication. Since bearing life in a high speed turbine is critical, continuous lubrication and an efficient lubricating system is mandatory.

Summary of the invention

Therefore, it is an object of this invention to provide a means for automatically lubricating the bearings of a mercury-vapor turbogenerator.

Another object of this invention is to make use of residual heat contained in the exhaust gases of combustion leaving the boiler or superheater to raise the temperature of the lubricating fluid in a restricted branch of the boiler feed line and, thereby, to also increase the vapor pressure within it.

According to the broader aspects of this invention, a heat exchanger is attached to the restricted branch for using residual heat in the exhaust gases to heat a silicone fluid, to vaporize it, and to create a pressure differential across a nozzle or orifice located in the condenser so as to lubricate the bearings with a vapor mist.

Brief description of the drawing

The above-mentioned and other objects of this invention will become more apparent by reference to the sole figure, which shows the lubricating arrangement for a mercury-vapor turbogenerator according to this invention.

Description of the preferred embodiment

Referring now to the figure, a propane vapor 1 is permitted to flow as a gaseous fuel from a storage tank when solenoid valve 2 is energized. Such flow is controlled by a constant-head device 3 and a regulating needle valve or orifice 4 to feed the burner 5. Upon ignition of the fuel with a glow coil or pilot light, the burner heats liquid mercury 6 in a boiler to evaporate it and then to further heat its vapor in a superheater 7 by the exhaust gases in stack 8. After expansion in a nozzle 9, the mercury-vapor jet rotates a wheel assembly 10 whose blades travel at a linear velocity suitable in ratio to the vapor velocity. The mercury vapor thereafter reverts to liquid form in the condenser 11 which is cooled by the free circulation of external sea water 12. The condensed mercury, due to its very high density, is returned by gravity to the boiler in a feed line 13. The rotating wheel 10 directly drives a permanent-magnet rotor 14 which, in turn, causes the production of electrical energy within the stator 15 that is made available to recharge batteries through appropriate circuits and controls.

In the course of producing the turbogenerator unit, after thermal purging and during evacuation, the turbogenerator unit is charged with a predetermined quantity of liquid mercury 6. Thereafter, a predetermined amount of silicone fluid 16 is admitted through the condenser to become entrapped atop the liquid mercury column in the boiler feed line 13. In operation, the mercury condensate, because of its greater specific weight, drops through the liquid silicone (shown as dotted lines 21) into the return line where it is fed by gravity into the boiler. The silicone fluid 16, because of its lesser density, floats on top of the column of liquid mercury. Choice of the proper silicone fluid permits a vapor pressure, at the operating temperature of the condenser, that is suitable for the thermodynamic cycle of the turbogenerator.

During operation of the turbogenerator, the higher boiler and superheat pressure $P_1$ will be separated and maintained from the lower condenser pressure $P_2$ by impedance of the nozzle 9 to the equalizing flow of vapor, and by the self-regulating height and weight of the combined liquid column of mercury and silicone in the boiler-feed line 13. The greater the pressure differential $\Delta P_{12}$ between $P_1$ and $P_2$, the higher the combined liquid column in the return line 13.

The introduction of a parallel branch 17 in the upper part of the vertical boiler-feed line 13 provides a double path for the rising liquid column at the start of operation. If there were no external influence upon the silicone fluid, the level of the silicone liquid would be the same in each branch. However, if heat were to be applied locally to the silicone fluid in one branch so as to increase the vapor pressure $P_3$ above it, and if the release of the vapor from this branch were controlled by means of a metering orifice or nozzle 18, a difference $\Delta P_{23}$ in the heights of the two liquid silicone columns would be caused. This difference in height measures the pressure difference $\Delta P_{23}$ existing between that in the parallel restricted branch 17 having a pressure $P_3$, and that in the turbogenerator condenser having a pressure $P_2$.

It is an object of this invention to make use of residual heat contained in the exhaust gases of combustion leaving the superheater to raise the temperature of the silicone fluid in the restricted branch of the boiler-feed line and, thereby, to also increase the vapor pressure within it. This is accomplished passing hot exhaust gases in stack 8 through a heat exchanger 19 having heat transfer fins and attached to the restricted branch 17 of the boiler-feed line 13.

The silicone vapor is then further heated by the exhaust gases to assure a useful level of heat content within it as it approaches the nozzle or orifice 18 in its flow within the restricted branch. As it flows through the nozzle to leave the restricted branch, it expands and its pressure drops from $P_3$ to the condenser pressure $P_2$. In the process, its heat content also drops having converted some heat energy into the kinetic energy of a jet stream and the quality of the vapor changed to increased wetness. The resulting jet is a silicone vapor condensate lubricating mist which is directed upon the bearings 20 to lubricate them. The environment within the condenser is such as to recondense the silicone vapor to liquid form for recirculation within the system as a lubricant.

Several types and grades of silicone fluids are available for the disclosed application. The principal properties denoting the suitability of the particular silicone fluid are those of chemical stability, viscosity, gel time, boiling point vs. pressure, and vapor pressure vs. temperature. By way of example, General Electric Silicone Fluid SF–1093 or Dow Corning Silicone Fluid 210–H is suitable for the application in the viscosity grade of 100 to 1500 centistokes.

I claim:

1. A lubricating arrangement for a mercury-vapor turbogenerator wherein a combustible fuel is used to convert the mercury operating fluid within a boiler to a mercury vapor, the vapor is superheated in a superheater section by the exhausting combustion gases which are removed by an exhausting stack, the superheated vapor is expanded in a nozzle to drive a wheel assembly which is connected to the ball bearing mounted rotor of a generator to produce electrical energy, and the expanded vapor is condensed in a condenser and returned in a boiler feed line to the boiler, so that the operating fluid is confined in a closed system, the improvement which comprises:
   a restricted branch which is led through said exhausting stack and forms a branch leg of said feed line;
   a nozzle terminating said restricted branch at a point adjacent said bearings;
   a lubricating fluid having a specific weight which is less than the mercury operating fluid, said lubricating fluid being entrapped atop the mercury column within said feed line and restricted branch; and
   means for using the residual heat in the exhaust gases to heat the lubricating fluid within said restricted branch, so as to vaporize it and create a pressure differential across said nozzle located in the condenser,
   whereby a lubricating mist is formed and directed upon said bearings.

2. An arrangement according to claim 1, in which said means using the residual heat in the exhaust gases is a heat exchanger attached to a portion of said restricted branch within said exhausting stack, such that as the hot exhaust gases pass through said heat exchanger, said lubricating fluid is vaporized and the pressure within said restricted branch is increased.

3. An arrangement according to claim 2, in which said restricted branch extends beyond said heat exchanger, so that the lubricating vapor is further heated to ensure a proper level of heat content as the vapor approaches said nozzle, and as the vapor flows through said nozzle it expands, and its pressure drops from that of said restricted branch to that of said condenser, whereby a jet vapor condensate lubricating mist is directed upon the bearings.

4. An arrangement according to claim 3, wherein said lubricating fluid is a silicone fluid which is vaporized within said restricted branch and condensed within said condenser to liquid form for recirculation within the closed system.

5. An arrangement according to claim 4, wherein said silicone fluid has a viscosity of 100 to 1500 centistokes, so that the silicone fluid floats on top of the column of liquid mercury in the feed line, and the mercury condensate, because of its greater specific weight, drops through the liquid silicone in said return feed line and is fed by gravity to the boiler.

6. A lubricating arrangement in combination with a mercury-vapor turbogenerator of the type wherein a combustible fuel is used to convert the mercury operating fluid within a boiler to a mercury vapor, the vapor is superheated by the exhausting combustion gases which are removed by an exhausting stock, the superheated vapor is then expanded in a nozzle to drive a wheel assembly which is connected to and drives a ball bearing mounted rotor of a generator to produce electrical energy, and the expanded vapor is condensed in a condenser and returned in a boiler feed line to the boiler, so that the operating fluid is confined in a closed system, the improvement which comprises:
   a restricted branch which is partially enclosed by said exhausting stack and forms a branch leg of said feed line;
   a nozzle array terminating said restricted branch at a point adjacent said bearings;
   a lubricating fluid having a specific weight which is less than the mercury operating fluid, said lubricating fluid being entrapped atop the mercury column within said feed line and within said restricted branch; and
   heat exchanger means for using the exhaust gases in said stack to heat the lubricating fluid within said restricted branch, so as to vaporize it and create a pressure differential across said nozzle located in the condenser,
   whereby a mist of said lubricating fluid is directed upon said bearings.

7. An arrangement according to claim 6, in which said heat exchanger means includes heat transfer fins attached to a portion of said restricted branch which is enclosed within said exhausting stack, such that as the hot exhaust gases pass through said fins, said lubricating fluid is vaporized and the pressure within said restricted branch is increased.

8. An arrangement according to claim 7, in which said restricted branch extends beyond said heat transfer fins, so that the lubricating vapor is further heated to ensure a proper level of heat content as the vapor approaches said nozzle array, and as the vapor flows through said nozzle array it expands, and its pressure drops from that of said restricted branch to that of said condenser, whereby a jet vapor condensate lubricating mist is directed upon the bearings.

9. An arrangement according to claim 8, wherein said lubricating fluid is a silicone fluid which is vaporized, condensed, and recirculated within the closed system.

10. An arrangement according to claim 9, wherein said silicone fluid has a viscosity of 100 to 1500 centistokes, so that the mercury condensate, because of its greater specific weight, drops through the liquid silicone in said return feed line and is fed by gravity to the boiler.

References Cited

UNITED STATES PATENTS

| | | | |
|---|---|---|---|
| 1,804,694 | 5/1931 | Jones | 60—36 |
| 2,495,745 | 1/1950 | Litton | 290—52 |
| 2,886,133 | 5/1959 | Mauck et al. | 184—6 |
| 2,961,550 | 11/1960 | Dittman | 184—6 XR |
| 3,242,345 | 3/1966 | Kimura et al. | 60—36 XR |

FRED C. MATTERN, JR., *Primary Examiner.*

MANUEL ANTONAKAS, *Assistant Examiner.*

U.S. Cl. X.R.

184—6; 290—2, 52